Sept. 22, 1925.

H. PEARCE

PROTECTIVE SYSTEM

Filed Nov. 8, 1921

1,554,648

2 Sheets-Sheet 1

Inventor:
Herbert Pearce,
by Albert G. Davis
His Attorney

Sept. 22, 1925.

H. PEARCE

PROTECTIVE SYSTEM

Filed Nov. 8, 1921

Inventor:
Herbert Pearce,
by Albert E. Davis
His Attorney

Patented Sept. 22, 1925.

1,554,648

UNITED STATES PATENT OFFICE.

HERBERT PEARCE, OF RUGBY, ENGLAND, ASSIGNOR TO GENERAL ELECTRIC COMPANY, A CORPORATION OF NEW YORK.

PROTECTIVE SYSTEM.

Application filed November 8, 1921. Serial No. 513,691.

*To all whom it may concern:*

Be it known that I, HERBERT PEARCE, a subject of the King of Great Britain, residing at Rugby, in the county of Warwickshire, England, have invented certain new and useful Improvements in Protective Systems, of which the following is a specification.

My invention relates to improvements in protective apparatus for alternating current distribution systems. Such apparatus usually consists of relays adapted to control the operation of suitable circuit interrupting means upon the occurrence of a fault to earth in the system protected, further relays being provided adapted to control the operation of the circuit interrupting means upon the occurrence of faults between phases, the former relays being set more sensitively than the latter.

The object of my invention is to provide an improved protective system of this type and to that end it consists in providing current transformers at each of two points on the conductors of a distribution system and connecting the secondaries of the transformers in series through the windings of relays adapted to operate suitable circuit interrupting means for cutting out the conductors between the two points upon the occurrence of a fault to earth, the faults between phases being taken care of by connecting a point or points in the secondary circuit of the transformers at each of the two points of the distribution system through relays adapted to operate so as to open the circuit interrupting means upon the occurrence of a fault between phases.

My invention will be better understood from the following description taken in connection with the accompanying two sheets of drawings and its scope will be pointed out in the appended claims.

Figure 1:
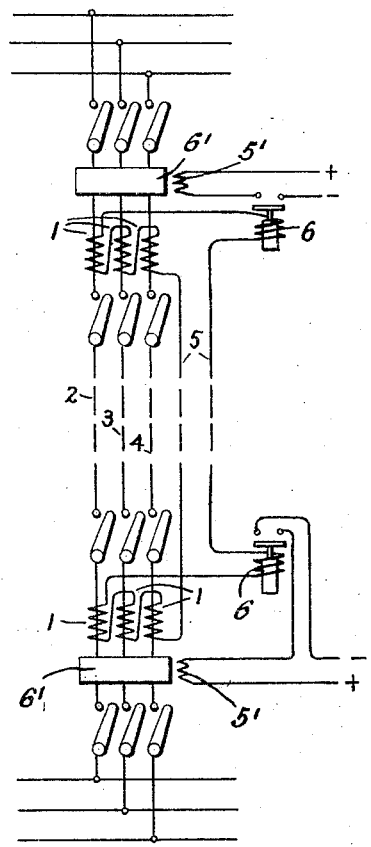
Figure 2:
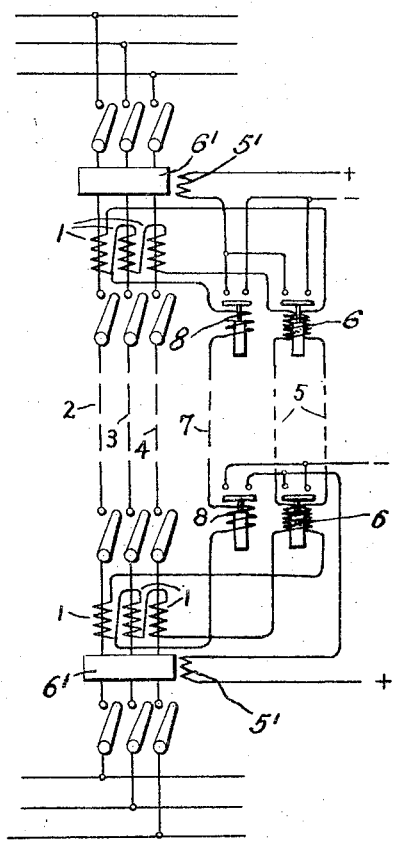
Figure 3:
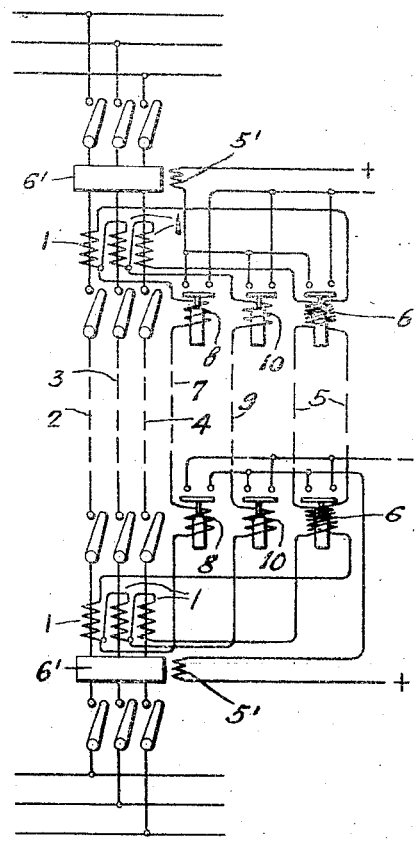
Figure 4:
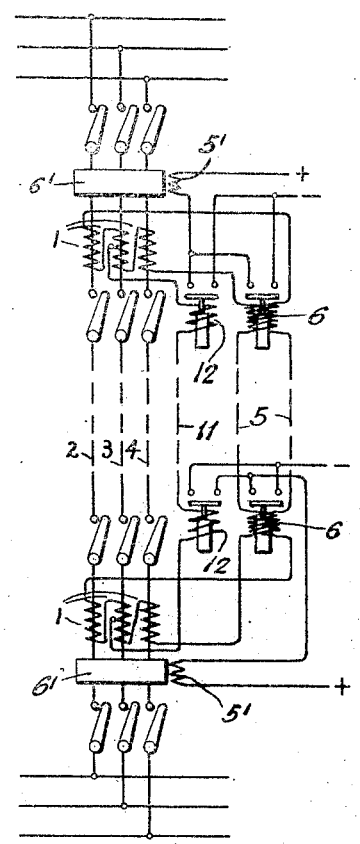

Figure 1 illustrates diagrammatically an arrangement for protecting a three-phase system against faults to earth only; Fig. 2 illustrates diagrammatically an arrangement for protecting a three-phase system against faults to earth and faults between two of the phases; Fig. 3 illustrates diagrammatically an arrangement for protecting a three-phase system against faults to earth and faults between any of the phases; and Fig. 4 illustrates diagrammatically a modification of the arrangement shown in Fig. 3.

Fig. 1 shows an arrangement for protecting a three-phase feeder against faults to earth only, comprising a plurality of current transformers 1, one for each of the conductors 2, 3 and 4 of the feeder at two points thereof. The secondaries of the transformers 1 at each point are connected so that normally the resultant electromotive force of each set of secondaries is zero, the connection for a three-phase system being open-delta. Each set of open-delta connected secondaries is connected in series in a closed circuit comprising pilot wires 5 so that the electromotive force of each transformer at one point of the system is opposed to the electromotive force of the corresponding transformer at the other point. Therefore with normal conditions on the feeder, no current flows in the circuit 5. The windings of relays 6 are connected in circuit with one of the pilot wires 5, the relays 6 being arranged to control, for example, the circuits of trip-coils 5' adapted to effect the operation of suitable circuit interrupting means 6' in a manner well known to the art. If the neutral of the distribution system is earthed, then upon the occurrence of a fault to earth on the feeder between the points at which the transformers 1 are located, the resultant electromotive force of each set of transformers will not be zero. The resultant electromotive forces of the two sets of transformers will, however, be unequal and since the transformers are connected for opposing electromotive forces, a current will flow in the pilot wire circuit 5 thus actuating the relays 6, which control the circuits of the trip coils 5', thereby to effect the operation of the circuit interrupting means 6'. Upon the occurrence of a through fault to earth, that is a fault to earth outside the section between the two sets of transformers, the resultant electromotive force of each set of transformers will not be zero. The resultant electromotive forces will, however, be equal and since the transformers are connected in the circuit 5 for opposing electromotive forces, no current will flow in the circuit 5 and the relays 6 consequently remain inoperative.

Fig. 2 shows an arrangement for protecting against faults to earth and faults between two of the phases of a three-phase system. In this arrangement, the means for protecting against faults to earth is similar to that shown in Fig. 1 and operates in substantially the same manner. I prefer, however, in this arrangement to have the relay 6 of a type known as a differential relay having two windings, one in each side of the pilot wire circuit 5, the windings being arranged to assist when current flows in opposite directions in the two pilot wires 5 and to oppose when current flows in the same direction in both of the pilot wires 5. Therefore with a fault to earth on any one of the conductors 2, 3 and 4 between the points at which the current transformers 1 are connected, a current will flow in the circuit 5 as heretofore described, this current being in opposite directions in the two windings of each of the relays 6. The windings being arranged to assist under these conditions, the relays 6 will operate to complete the circuits of trip-coils 5′ adapted to effect the operation of the circuit interrupting means 6′.

For protection against faults between phases, I further provide an additional connection or pilot wire 7 between corresponding points in the secondary circuit of each set of transformers 1. In circuit with the pilot wire 7 are relays 8 operative in response to faults between two of the phases on the feeder between the two points at which the transformers are located to control the circuits of the trip-coils 5′ and thereby to effect the operation of the circuit interrupting means 6′. Assuming now a short circuit between conductors 2 and 3, the electromotive forces in the secondaries of the transformers in these conductors at the point on the supply side of the feeder will be considerably greater than the electromotive forces in the corresponding transformers at the other points. Each of the transformers in the conductors 2 and 3 on the supply side of the fault therefore causes a current to flow through the pilot wire 7 in the same direction. At the other set of transformers this current divides substantially equally returning through the pilot wires 5 on the respective sides of the circuit in the same direction. The relays 8 are therefore caused to operate while the relays 6 remain inoperative since the current in the two windings of each of the relays 6 is substantially the same and in the same direction, the two windings being opposed in this case. It is therefore obvious that the relays 6 are inoperative on faults between phases while the relays 8 are inoperative on faults to earth. Consequently the earth fault responsive relays 6 may be set to be more sensitively responsive than the relays 8. For a short circuit between conductors 2 and 4, the operation is similar to that already described. For a short circuit between conductors 3 and 4, however, the electromotive forces in the transformers in these conductors on the supply side of the fault due to the short circuit current are equal and opposed and no unbalanced electromotive forces exist to produce a current in pilot wires 5 and 7.

In order to take care of faults between all of the phases, I provide the arrangement shown in Fig. 3 where another pilot wire 9 having relays 10 in circuit therewith provides a path for the unbalanced electromotive forces in the transformers in the conductors 3 and 4 due to a short circuit thereon. With this additional means short circuits between conductors 3 and 4 as well as between conductors 2 and 4 and 2 and 3 are taken care of in a manner similar to that described for protection on short circuits between conductors 2 and 3 and 2 and 4 respectively. The relays 10 are arranged to control the circuits of the trip-coils 5′ thereby to effect the operation of the circuit interrupting means 6′.

The arrangement shown in Fig. 3, however, necessitates four pilot wires and as it is desirable to have the number of pilot wires a minimum, I preferably provide the simplified arrangement or modification shown in Fig. 4. In this arrangement, a conductor or pilot wire 11 connects an intermediate point of the intermediate leg of one set of open-delta connected secondaries to the corresponding point in the other set, relays 12 being included in circuit with the pilot wire 11 for operation on faults between phases. With this arrangement, the operation of the relays 6 on faults to earth is similar to that heretofore described. Assuming now a short circuit between conductors 2 and 4, the short circuit current will produce high electromotive forces in the current transformers in the conductors 2 and 4 on the supply side of the fault. These electromotive forces cause a current to flow in the pilot wire 11 to the other set of transformers where the current divides substantially equally and returns through each of the pilot wires 5 in the same direction. The relays 6 thus remain inoperative while the relays 12 operate. The relays 6 and 12 are arranged to control the circuits of trip coils 5′ adapted to effect the actuation of the circuit interrupting means 6′. Assuming now a short circuit between conductors 2 and 3, high electromotive forces will be induced in the transformers in these conductors on the supply side of the fault. In this case, a part of the electromotive force of the transformer in conductor 3 and the resultant electromotive force of the remainder of the electromotive force of this transformer and the opposed electromotive force of the transformer in conductor 2 will cause a current to flow in pilot wire 11 to the other set of transformers where the current divides substantially equally and returns through pilot wires 5 in the same direction. The relays 12 are thus caused to operate while the relays 6 remain inoperative. For a short circuit between conductors 3 and 4, the operation is similar to that described for conductors 2 and 3. Obviously, in each case since the relays responsive to phase faults operate independently of the relays responsive to earth faults and vice versa the earth fault relays may be set to respond as sensitively as desired.

Protective systems such as above described are equally applicable to circuits having one, two or more phases, although I have described it in connection with a three-phase system, and the particular constructions of the relays used form no part of the present invention. While I have described my invention as applied to the protection of feeders, it may be applied to other electrical circuits or apparatus provided that in the case of transformers or transformer combinations the ratio of the protective transformers be designed to suit the ratio of the main transformers. Also where the invention is applied to the protection of electrical apparatus other than feeders, one set of relays may be omitted. In all the arrangements described above, each phase conductor has its own protective transformers, so that by using the protective gear described, the phases may conveniently be separated in the manner customary for switch gear controlling circuits on either high voltage or large power systems.

What I claim as new and desire to secure by Letters Patent of the United States, is,—

1. Protective means for an alternating electric current distribution system comprising a plurality of current transformers one for each conductor of the system at each of two different points thereof having their secondaries connected in series in a closed circuit, the resultant electromotive force of the current transformers at each point of the system normally being zero and the electromotive force of each current transformer at one point being opposed to the electromotive force of the corresponding current transformer at the other point, a connection from a point in the circuit including the current transformers at one point of the system to a corresponding point in the circuit including the current transformers at the other point of the system, a relay provided with a pair of differential windings connected in the respective sides of said closed circuit whereby the relay is operative in response to a fault to earth between said two points of the system and inoperative on a fault between phases, a relay connected in circuit with said connection operative in response to faults between phases on said system between said points and circuit interrupting means in said system adapted to be actuated in response to the operation of said relays.

2. A system for protecting alternating current distribution systems against faults to earth and faults between phases comprising in combination with a three-phase circuit, current transformers in each conductor of said circuit at two points thereof, the secondaries of said transformers at each point being connected open-delta, a pilot wire circuit including each set of open-delta connected secondaries connected in series for opposing electromotive forces, differential relays connected in series in said pilot wire circuit operative in response to faults to earth on said three-phase circuit, a second pilot wire circuit including a conductor connected at corresponding points of each set of open-delta connected secondaries, and relays connected in series in said conductor operative in response to faults between phases between said two points of the three-phase circuit.

3. Protective means for an alternating current distribution system comprising at two points of the system current transformers for each phase of the system having their secondaries connected in series in a closed circuit including two pilot wires, the connections between said transformers being such that a current flows in said closed circuit upon the occurrence of a fault to earth between the two points of said system, an additional pilot wire connecting corresponding points of the transformers at the two points of the system comprising with said two pilot wires and transformers two closed circuits adapted to be energized upon the occurrence of a fault between phases between the two points of the system, a relay having two differential windings one in circuit with one of said two pilot wires and the other with the second of said two pilot wires thereby adapted to respond to a fault to earth and to remain inoperative on a fault between phases, and a relay in circuit with said additional pilot wire operative in response to faults between phases.

4. In protective means for a three-phase alternating electric current distribution system, the combination with the conductors of said system of a plurality of current transformers one for each conductor of the system at each of two points thereof, the secondaries of the transformers at each point being open-delta connected for balanced electromotive forces, a closed circuit including each set of open-delta connected secondaries connected in series for opposing electromotive forces, a relay provided with a pair of differential windings connected in the respective sides of said closed circuit whereby the relay is operative in response to a fault to earth on the system between said points and inoperative on a fault between phases on said system, a conductor connecting an intermediate point of the secondary in the intermediate leg of one set of open-delta connected secondaries to the corresponding point in the other set of open-delta connected secondaries, a relay connected in circuit with said conductor operative in response to a fault between phases between said two points of the system, and circuit interrupting means in said system adapted to be actuated in response to the operation of said relays.

5. A protective system for alternating current polyphase distribution systems comprising at one point in the system a current transformer for each phase of the system, and at a second point another current transformer for each phase of the system, a pilot wire circuit connecting said current transformers in a closed circuit, the connections between the transformers at each point of the system and the connections of the pilot wire circuit to the transformers being such that with normal conditions in the distribution system no current flows in the pilot wire circuit whereby upon a fault to earth between the two points of the system current will circulate through the pilot wire circuit, an additional pilot wire connection from a point in the circuit including the current transformers at one point of the system to a corresponding point in the circuit including the current transformers at the second point of the system whereby upon a fault between phases current will circulate in a pilot wire circuit comprising the additional pilot wire and one side of the first mentioned pilot wire circuit, an electro-responsive device for operation upon faults to earth provided with a pair of differential windings connected in the respective sides of the first mentioned pilot wire circuit whereby a fault to earth on the system causes an operation of said electro-responsive device and whereby a fault between phases allows said device to remain inoperative, and an additional electro-responsive device connected in said additional pilot wire for operation upon faults between phases between the two points of the system, and circuit interrupting means in said system adapted to be actuated in response to the operation of said electro-responsive devices.

In witness whereof, I have hereunto set my hand this nineteenth day of October, 1921.

HERBERT PEARCE.